United States Patent
Kona et al.

(10) Patent No.: US 10,146,781 B2
(45) Date of Patent: Dec. 4, 2018

(54) SYSTEM AND METHOD FOR PRIOR PERIOD ADJUSTMENT PROCESSING

(71) Applicant: XACTLY CORPORATION, San Jose, CA (US)

(72) Inventors: Anil Kumar Kona, Livermore, CA (US); Desta Renee Price, Los Gatos, CA (US)

(73) Assignee: XACTLY CORPORATION, San Jose, CA (US)

( * ) Notice: Subject to any disclaimer, the term of this patent is extended or adjusted under 35 U.S.C. 154(b) by 0 days.

(21) Appl. No.: 15/421,108

(22) Filed: Jan. 31, 2017

(65) Prior Publication Data

US 2018/0217999 A1    Aug. 2, 2018

(51) Int. Cl.
G06F 7/00      (2006.01)
G06F 17/30    (2006.01)
G06Q 40/00   (2012.01)

(52) U.S. Cl.
CPC .. *G06F 17/30088* (2013.01); *G06F 17/30091* (2013.01); *G06F 17/30132* (2013.01); *G06Q 40/125* (2013.12)

(58) Field of Classification Search
CPC ................................................ G06F 17/301
See application file for complete search history.

(56) References Cited

U.S. PATENT DOCUMENTS

2011/0093471 A1*  4/2011  Brockway ......... G06F 17/30616
                                                         707/747

* cited by examiner

*Primary Examiner* — Ajith Jacob
(74) *Attorney, Agent, or Firm* — Hickman Palermo Becker Bingham LLP; Christopher J. Palermo

(57) ABSTRACT

A data processing method comprises: using an application server computer, receiving a workflow for single period processing, the workflow comprising steps for processing data items related to the period, processing the data items according to the workflow to generate an output, capturing, during processing, metadata about the output, storing the output, the workflow, the data items, and the metadata in a database, receiving a modification to one or more of the data items and storing the modification to result in modified data items, receiving, during an open period, a request to reprocess the period using the modified data items, wherein the open period is subsequent to the SPP, in response to the request, processing, according to the workflow and the metadata, the modified data items to generate modified output, determining a difference between the output and the modified output, carrying the difference over to the open period.

20 Claims, 9 Drawing Sheets

|  | January | February | March | April |
|---|---|---|---|---|
| January | 1.) Process<br>2.) Lock | | | |
| February | 3.) Process PPA<br>4.) Lock | 3.) Process PPA<br>4.) Lock | | |
| March | 7.) Process PPA<br>8.) Lock | 7.) Process PPA<br>8.) Lock | 5.) Process March<br>6.) Reset March<br>7.) Process PPA<br>8.) Lock | |
| April | 11.) Process PPA<br>12.) Reset PPA<br>13.) Process PPA<br>14.) Lock | 11.) Process PPA<br>12.) Reset PPA<br>13.) Process PPA<br>14.) Lock | 11.) Process PPA<br>12.) Reset PPA<br>13.) Process PPA<br>14.) Lock | 9.) Process April<br>10.) Reset April<br>11.) Process PPA<br>12.) Reset PPA<br>13.) Process PPA<br>14.) Lock |

As of Period / Current Period

BoxA 205 → (January, January cell)
BoxB 210 → (February, January cell)
Table 200

Fig. 2

SYSTEM AND METHOD FOR PRIOR PERIOD ADJUSTMENT PROCESSING

TECHNICAL FIELD

The technical field of the present disclosure generally relates to improved methods, computer software and/or computer hardware in the field of accounting data processing. The disclosure relates more specifically to improved computer-implemented methods for performing prior period adjustment processing.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Businesses, both small and large, are growing increasingly more sophisticated in their collection and use of data covering all aspects of all relationships and interactions of the business. Data is collected regarding sales, taxes, expenses, budgets, inventory, employees, contracts, and many other areas. In particular, the quantity and quality of accounting related data has increased especially rapidly in recent years. Broadly speaking, accounting related data is any data relating to money including, but not limited to: employee compensation, sales, sale attribution, employee hierarchies or management structures, targets, goals, bonuses, etc. Accounting data, in particular, receives special scrutiny due to reporting requirements to local or federal governments, employee scrutiny of their paychecks, internal audits, external audits, etc. The enhanced level of scrutiny and reporting requirements effectively impose strict accuracy, documentation, and reproducibility requirements when processing accounting data. This results in long and difficult processing times.

As business increased their data collection, the increases in hardware and on-premises software support costs gave way to a new technology delivery model in which an application service provider hosts applications coupled to data storage units on networked devices that are owned by the application service provider. Using "software as a service" or SaaS, the application service provider's customers, typically business enterprises, connect to the hosted applications via a web browser and enter data via the applications with the expectation that the data entered will be available on-demand whenever needed. The customers typically access the data for various data mining or data aggregation operations required to perform various analytics, such as determining particular trends related to their enterprise's operations. A practical example is analysis of the compensation that is due to employees of an enterprise that uses an incentive compensation plan in which compensation is tied to sales, quotas, products, services and customers, all of which may vary over time. Each different enterprise customer of the application service provider is considered a "tenant" having data that is commingled in a multi-tenant database system using a single shared database, yet subject to security controls that prevent one tenant from viewing or using the data of another tenant; the tenants may be competitors or simply require confidentiality of their data.

In such a system, the application service provider rarely has advanced notice of when a customer may request access to its data; therefore, data entered by customers must be available at all times. Consequently, the application service provider must ensure that data entered by customers is always recorded and stored, and that customers may access that data, on-demand, for later consumption.

A commonly requested feature for accounting applications is the ability to perform prior period adjustment (PPA) and systemically process all prior periods called Prior period processing (PPP). A period is an accounting period having a set amount of time, such as two weeks or a month. Once data has been entered for a period, and the time associated with the period has passed, a single period processing (SPP) is processed to determine, for example, the amount to pay individual employees. Once processed, the period is closed, and a new period is begun. PPA is when a previously closed and completed period is reprocessed, typically in response to data from the closed period changing in a subsequent period. For example, a sales amount may have changed or been entered incorrectly. PPA is very resource and time demanding, as large amounts of data must be accurately stored and processed. This effect is multiplied in a multitenant system, as there are many different tenants, and PPA may result in locking customers out of their data for hours or even days. Improvements in PPA are needed.

BRIEF DESCRIPTION OF THE DRAWINGS

In the drawings:

FIG. 2 illustrates an "as of" period in accordance with an embodiment.

DETAILED DESCRIPTION OF EXAMPLE EMBODIMENTS

Figure 1:
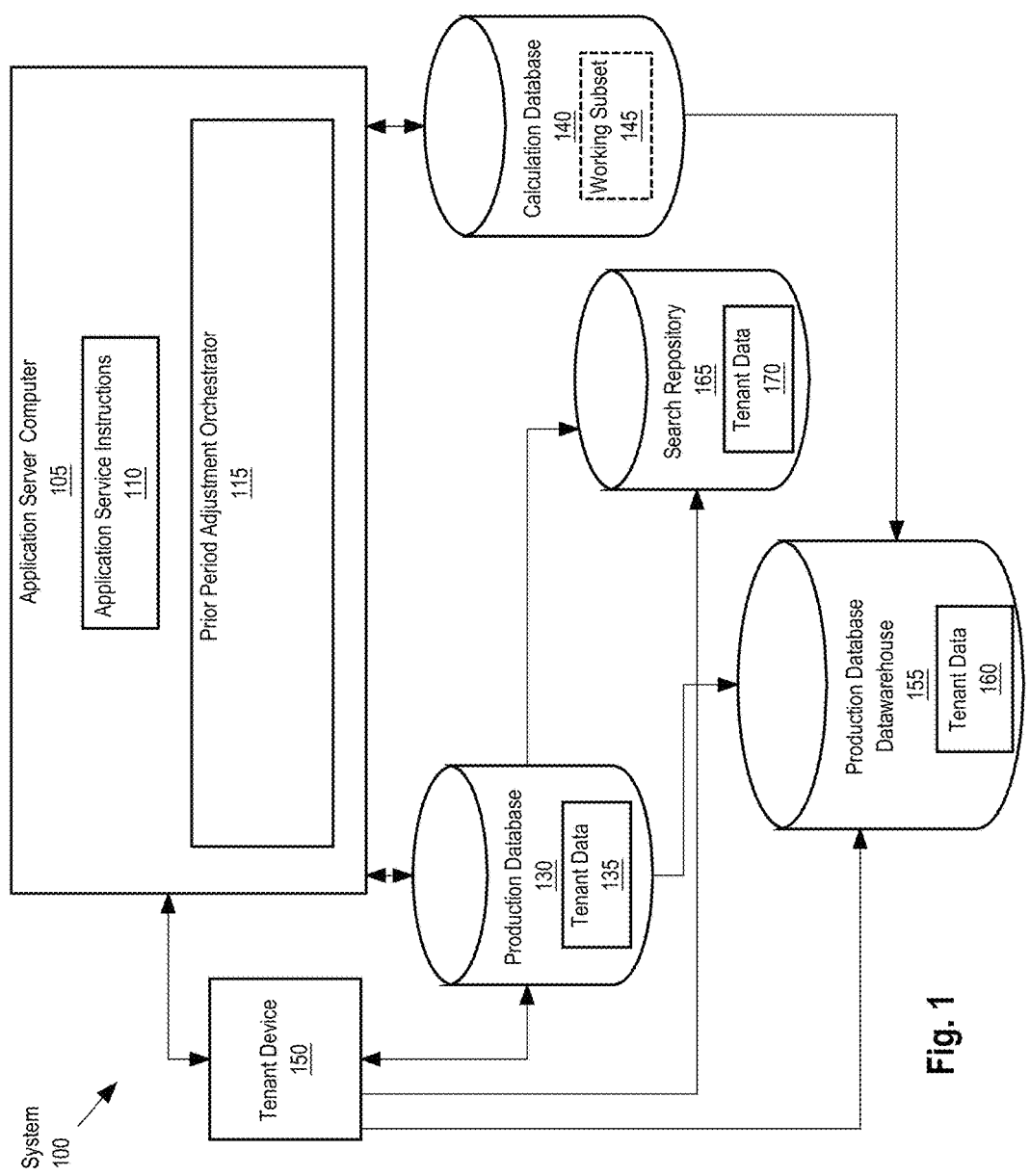
FIG. 1 illustrates an example computer system in which the techniques described may be practiced, according to one embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Embodiments are described in sections according to the following outline:

1. OVERVIEW
2. EXAMPLE COMPUTER SYSTEM IMPLEMENTATION
3. EXAMPLE FUNCTIONAL IMPLEMENTATION
4. HARDWARE OVERVIEW

1. Overview

In the following description reference will be made to both data stores and databases. A data store is a repository for data. Similarly, a database is a structured data store. A database may be structured in any suitable way, and should not be limited by the examples provided herein. Further, while reference may be made to either a data store or database, the invention is not limited to one or the other. In other words, when a database is used to describe one embodiment of the invention, a data store may also be used. Likewise, if a data store is used to describe another embodiment, a database may also be used.

Apache HBase, developed by the Apache Software Foundation of Forest Hill, Md., is a non-relational distributed database capable of handling tremendous amounts of data in an efficient manner. Although reference may be made to HBase throughout this specification, the invention is applicable to many other database applications and/or implementations, and should not be limited to HBase. HBase may be used in conjunction with a multitenant service or application. For example, an HBase database may be used by many companies to store their compensation data in a shared database coupled via networks to one or more server computers that execute instances of server-based applications that implement a multitenant service or system. An example of a multitenant system is XACTLY INCENT ENTERPRISE, commercially available from Xactly Corporation, San Jose, Calif.; it is hosted by a service provider to provide shared access to custom applications that provide specialized analysis, reporting, and visualization of the compensation data. While use of the applications or application instances may be shared, data is effectively segregated by tenant to prevent transfer of confidential information of tenant to another.

In an embodiment, each company retains full access to its private data, and may also gain access to aggregated, anonymized data from all other tenants. Alternatively, the aggregated data may not be anonymized. The aggregated data may be made available in many different ways, and may be used by each individual company as a benchmark for use in a variety of ways, such as determining whether their employees are properly compensated.

For purposes of illustrating a clear example, throughout this detailed description, references may be made to compensation data as the type of data that is stored. However, other embodiments may be implemented for use with other kinds of data and embodiments are not limited to compensation data.

Computer-implemented techniques are provided for PPA. Specifically, a tenant specifies a workflow or order for processing their tenant data. The tenant data is processed according to the workflow to generate an output, and metadata about the processing is captured. The output, metadata, and tenant data is stored. Subsequently, the tenant may modify their tenant data, and the data is reprocessed through PPA by using the workflow, metadata, and modified tenant data to generate a modified output. The differences between the original output and the modified output are determined, and carried over to an open accounting period. The impacted parties are subsequently notified.

In one embodiment, a data processing method comprises the computer implemented steps of: using an application server computer, receiving a workflow for processing a single period, wherein the workflow comprises a plurality of steps for processing a plurality of data items related to the period; processing the plurality of data items according to the workflow to generate an output, wherein the period is closed after processing; capturing, during processing, metadata about the output; storing the output, the workflow, the plurality of data items, and the metadata in a database; receiving a modification to one or more of the plurality of data items and storing the modification to result in a modified plurality of data items; receiving, during an open period, a request to reprocess the period using the modified plurality of data items, wherein the open period is subsequent to the SPP; in response to the request, processing, according to the workflow and the metadata, the modified plurality of data items to generate modified output; determining a difference between the output and the modified output; carrying the difference over to the open period.

Other embodiments, aspects and features will become apparent from the disclosure as a whole.

2. Example Computer System Implementation

FIG. 1 illustrates an example computer system in which the techniques described may be practiced, according to one embodiment.

In an embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1 illustrates application server computer 105 that is coupled via a wired or wireless connection, or a combination thereof, to production database 130, calculation database 140, and tenant device 150. Application server computer 105 comprises application service instructions 110 and prior period adjustment orchestrator 115. Production database 130 comprises tenant data 135, calculation database 140 comprises working subset 145, production database datawarehouse 155 comprises tenant data 160, and search repository 165 comprises tenant data 170.

In one embodiment, application server computer 105 may be any computing device, including but not limited to: servers, racks, work stations, personal computers, general purpose computers, laptops, Internet appliances, wireless devices, wired devices, multi-processor systems, mini-computers, and the like. Although FIG. 1 shows a single element, the application server computer 105 broadly represents one or multiple server computers, such as a server cluster, and the server computer may be located in one or more physical locations. Application server computer 105 also may represent one or more virtual computing instances that execute using one or more computers in a datacenter such as a virtual server farm.

Application server computer 105 is communicatively connected to production database 130 and calculation database 140 through any kind of computer network using any combination of wired and wireless communication, including, but not limited to: a Local Area Network (LAN), a Wide Area Network (WAN), one or more internetworks such as the public Internet, or a company network. Application server computer 105 may host or execute application service instructions 110, prior period adjustment orchestrator 115, and may include other applications, software, and other executable instructions, to facilitate various aspects of embodiments described herein.

In one embodiment, production database 130 is a database that is in production and accessible by tenants of the application server computer 105, such as tenant device 150. Production database 130 may be stored on any suitable storage device such as one or more hard disk drives, memories, or any other electronic digital data recording device configured to store data. Although production database 130 is shown as a single element, production database 130 may span multiple devices located in one or more physical locations and may span multiple separate databases within those devices. For example, production database 130 may be located on one or more nodes in a data warehouse or warehouses. Additionally, in one embodiment, production database 130 may be located on the same device or devices as application server computer 105. Alternatively, production database 130 may be located on a separate device or devices from application server computer 105.

In one embodiment, production database 130 is a columnar database. A columnar database is a database implemented using any suitable methodology, such as HBase. Alternatively, or in addition, production database 130 may be a relational database or any other type of database. Production database 130 may be of any size, portioned into any number of tables or other units, and may be organized in any way. Production database 130 stores tenant data 135, as described below. Production database 130 may also store additional data, such as aggregated tenant data, or any other kind of data related to or relevant to the embodiments and functionalities described herein. In one embodiment, production database 130 spans multiple separate databases based on the age of the tenant data stored. For example, data that is two years old and older may be stored in a first database with a first schema, while data for a current two year period is stored using a second database with a second schema.

In one embodiment, tenant data 135 is data related to a specific tenant of application server computer 105. Although tenant data 135 is depicted as a single element, there may be a private set of data for each tenant of application server computer 105 that is accessible only by the tenant associated with that tenant data. There may be any number of tenants and any number of separate tenant data. Tenant data 135 may relate to any type of data, such as personal information, business information, governmental data, compensation data, health data, environmental data, police/military data, etc. Tenant data 135 may span any time period, such as 3 years, 15 years, the life of the business associated with the tenant, or any other amount of time. Tenant data 135 is accessible by the associated tenant at any time for modifications, calculations, analysis, export, import, or any other action. While most of tenant data 135 is editable by the tenant, some portions thereof, such as calculated values, may not be editable by the tenant.

In one embodiment, calculation database 140 is a database that is used for calculations and is not directly accessible by tenants of the application server computer 105. Calculation database 140 may be stored on any suitable storage device such as one or more hard disk drives, memories, or any other electronic digital data recording device configured to store data. Although calculation database 140 is shown as a single element, calculation database 140 may span multiple devices located in one or more physical locations and may span multiple separate databases within those devices. For example, calculation database 140 may be located on one or more nodes in a data warehouse or warehouses. Additionally, in one embodiment, calculation database 140 may be located on the same device or devices as application server computer 105. Alternatively, calculation database 140 may be located on a separate device or devices from application server computer 105. Calculation database 140 is separate from production database 130, although calculation database 140 and production database 130 may be located in the same physical location or locations and may share hardware or other resources.

Calculation database 140 may be a columnar database, a relational database, or any other type or format of database. Calculation database 140 may be of any size, portioned into any number of tables or other units, and may be organized in any way. Calculation database 140 stores working subset 145, as described below. Calculation database 140 may prevent any modifications to data stored in calculation database 140. Thus, for example, new data may be added to calculation database 140, such as the result of a calculation, but the data used for the calculation would not be able to be modified.

In one embodiment, working subset 145 is the minimum amount of data needed to perform accurate PPA according to the policies of the associated tenant. Specifically, working subset 145 is a portion of data copied from tenant data 135. The size of working subset 145 may vary on a per tenant basis, as the policies relating to PPA may vary from tenant to tenant. In one embodiment the maximum amount of data is 18 months, although any amount of time may be used.

In one embodiment, production database datawarehouse 155 is a datawarehouse for production data, such as tenant data 160. Typically, the data in production database datawarehouse 155 is older or less commonly accessed by tenant device 150, and therefore is stored in a slower, cheaper location than the data stored in production database 130. Production database datawarehouse 155 may be stored on any suitable storage device such as one or more hard disk drives, memories, or any other electronic digital data recording device configured to store data. Although production database datawarehouse 155 is shown as a single element, production database datawarehouse 155 may span multiple devices located in one or more physical locations and may span multiple separate databases within those devices. Tenant data 160 may be identical to tenant data 135 or tenant data 170, or may contain different data than tenant data 135 or tenant data 170. For example, tenant data 160 may include older versions of data that tenant data 135 does not include, or any other suitable information.

In one embodiment, search repository 165 is a database or other repository that has been optimized for searching or other analytics. Tenant data 170 in search repository 165 may be the same or different from tenant data 135 or tenant data 160. Search repository 165 may be stored on any suitable storage device such as one or more hard disk drives, memories, or any other electronic digital data recording device configured to store data. Although search repository 165 is shown as a single element, search repository 165 may span multiple devices located in one or more physical locations and may span multiple separate databases within those devices.

In one embodiment, tenant device 150 is one or more computing devices, including, but not limited to: work stations, personal computers, general purpose computers, laptops, Internet appliances, hand-held devices, wireless devices, wired devices, portable or mobile devices, wearable computers, cellular or mobile phones, portable digital assistants (PDAs), smart phones, tablets, multi-processor systems, microprocessor-based or programmable consumer electronics, game consoles, set-top boxes, network PCs, mini-computers, and the like. Tenant device 150 may include applications, software, and/or other executable instructions to facilitate various aspects of the invention described herein. Specifically, tenant device 150 is able to send requests for accessing, adding to, deleting, or modifying tenant data 135, request that PPA be performed using associated tenant data, and receive or view the results of PPA and any other functionalities needed by the present invention. In one embodiment, there may be any number of tenant devices, and each unique tenant may include one or more devices. Tenant device 150 is communicatively connected to application server computer 105 through any kind of computer network using any combination of wired and/or wireless communication, including, but not limited to: a LAN, a WAN, the Internet, a company network, etc.

Returning to application server computer 105, application server computer 105 executes application service instructions 110. Application service instructions 110 are programmed or configured to perform steps or actions associated with or needed by the invention described herein. Specifically, application service instructions 110 may include a database interface such as JDBC or ODBC for communicating with production database 130 and calculation database 140. The database interface may communicate with any number of databases and any type of database, in any format, and may be a piece of custom software created by an entity associated with application server computer 105, or may be created by a third party entity in part or in whole. Further, application service instructions 110 are programmed or configured to send and receive data from or to tenant device 150, perform analytics on tenant data, generate reports or graphs based on analytics, and other functions needed by application server computer 105.

In one embodiment, application server computer 105 executes PPA orchestrator 115. PPA orchestrator 115 is programmed or configured to perform steps or actions needed for prior period adjustment processing (PPA). As briefly mentioned above, PPA is when a previously closed and completed accounting period is reprocessed, typically in response to data associated with the closed period changing. PPA orchestrator 115 is programmed or configured to receive data items related to accounting periods including, but not limited to: sales data, tax data, compensation data, accounting data, employee data, management structure data, and any other data related to businesses, individuals, or other entities. The received data may be processed or otherwise converted into a format used by PPA orchestrator 115 in any manner. The format used by the PPA orchestrator 115 may be the same or different than the format the data arrived in or the format the tenant or customers uses or generates the data in. A fundamental concept of PPA is shown in FIG. 2 and discussed below.

Turning to FIG. 2, table 200 is shown. Specifically, table 200 illustrates the concept of an "as of" period. In table 200, the current period is shown in columns, while the as of period is shown in rows. For FIG. 2, the period is a month, although a period may be any amount of time, such as two weeks, a quarter of a year, etc. Thus, the duration of a single processing period in FIG. 2 is a month. BoxA 205 shows January as of January. In other words, BoxA 205 shows how January's data looked in January when the January period was closed. Thus, BoxA 205 shows the steps that were performed in January as of January—1.) Process and 2.) Lock. The process step refers to any processing needed to process the period, and the lock step refers to the closing of the period, and any activities associated therewith. Any data associated with January as of January will be saved in a suitable database, such as production database 130, and will be able to be subsequently referenced if needed, as subsequent modifications to January's data will be saved separately. BoxB 210 shows January as of February. In other words, BoxB 210 shows how January's data looked in February. Thus, if January's data was altered at some point in February, that would be reflected in January as of February. Then when PPA is performed, and January is reprocessed as of February, the steps of 3.) Process PPA and 4.) Lock are performed, as shown in BoxB 210. After locking, the data for February as of February and January as of February is stored in a suitable database, such as production database 130, and will be able to be subsequently referenced if needed, as subsequent modifications to January or February's data will be saved separately, based on when the modifications were made, such as March, May, etc. The rest of table 200 may be read in a similar manner.

Returning to FIG. 1, in one embodiment, PPA orchestrator 115 is programmed or configured to receive a workflow for single period processing (SPP). The workflow indicates the steps to be taken when processing the period or as of period. As discussed above, a period may be any amount of time, such as 2 weeks, a month, a quarter, etc., and is typically the length of a pay period for a company. Processing SPP involves determining how much money is owed to which individuals or entities, including when that money is to be paid if there are holds and releases or other complicated methods of compensation. Depending on the order in which a pay period is processed, there can be different results. For example, processing a withholding amount before removing a bonus amount will result in a different size bonus than if the bonus amount is removed before processing the withholding. Thus, in order to ensure that any eventual reprocessing via SPP is correct and repeatable, such as is performed during PPA, the order of steps performed needs to be consistent.

PPA orchestrator 115 may receive the workflow data in any manner or format. In one embodiment, PPA orchestrator 115 may receive the workflow from tenant device 150 via a web browser, a specialized software application, or other program. Specifically, the workflow consists of process groups that define the steps or actions to be performed, and the order in which to perform them. Process groups may be organized in any manner, and may be reorganized at any time. Once a SPP has been run, and the period is closed, the workflow should not be changed, although tenants may be allowed to do so. Each process group that forms the workflow comprises an order, a name, a type, and a creator. The order identifies the order in which the process group should be executed, both relative to other process groups and the order of the steps within the process group. The name identifies the process group. The type identifies the type of the process such as a process group, SPP or PPA. The creator identifies a user who created the process group.

The individual steps that form a process group may be in any order specified by the tenant or user and may include any number of steps. Each step identified in a process group may have a name that identifies the step, a frequency that identifies the frequency of the step, and a type that identifies the type of step, or any other suitable attributes. The types of steps that may be included in a process group include, but are not limited to: Calculate Credits—calculates batches through to credits, this is a batch type of parameter; Calculate Incentives—calculates batches through to incentives, this is a batch type parameter; Calculate Balances—calculates draws and carry forward balances for admin-only review, this is a business group parameter type; Replay Release Log—(for PPA only) enables the re-releasing of held commissions for prior period adjustment using the percentage released from the original release; Reset to Pre-Credits—resets batches to their state prior to credits, this is a batch type parameter; Reset to Pre-Incentives—resets batches to their state prior to incentives, leaving any credits calculated, this is a batch type parameter; External Process—runs a connect process and allows updating of variables, this is an external process parameter type; Pause—stops the queue from processing until an administrator resumes the process; Email—sends an email notification, this is an email message parameter type; Delete Processed Orders by Batch—deletes all processed orders for the specified batch type, this is a batch type parameter; Purge by Batch—deletes all orders for the specified batch type, this is a batch type parameter; Delete Processed Orders by Period—deletes all processed orders for the period; Delete Staging Orders by Batch—deletes all staging orders for the specified batch type, this is a batch type parameter; Delete Staging Orders by Period—deletes all staging orders for the period.

When a process group or a step of a process group includes an external process step, PPA orchestrator 115 is programmed or configured to call the external process step and wait a predetermined amount of time for the external process to complete. The external process may be any type of process, such as extracting data from a third party service. The predetermined amount of time may be any amount of time, and may vary based on the type of process, time of day, tenant or user preferences, or any other variable. Once the process completes or the predetermined amount of time has expired, PPA orchestrator 115 sends a notification and the workflow continues based on the result of the external process. The individual processes are discussed in more detail below.

Figure 3A:
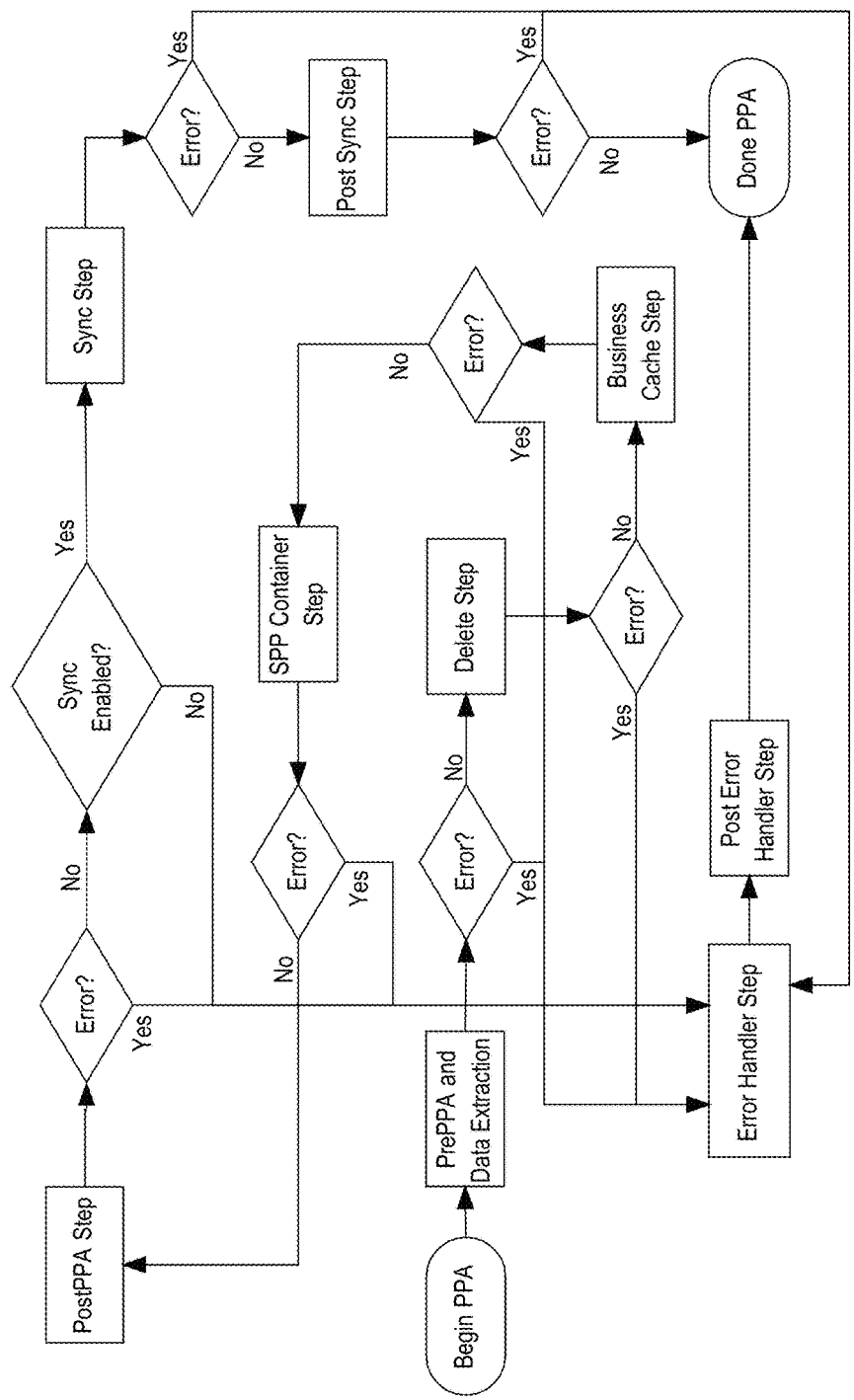
FIG. 3A, FIG. 3B, FIG. 3C, FIG. 3D, FIG. 3E illustrate workflow steps in accordance with an embodiment.

FIG. 3A is an overview of the individual steps performed during PPA. Specifically, FIG. 3A shows main process 300, which includes a variety of steps. After beginning PPA, preparatory actions and data extraction are performed to setup the PPA process and access needed data. Preparatory actions include initiation of extraction and moving of the "current" state of the data to a different data store for the purposes of versioning. Versioning of the data into a different store allows users to compare and contrast the changes in data—both input and calculated output—across time. Subsequently, the "current" version of the data is deleted from the calculation database in preparation for the computing of new data, and all of the tenant's metadata is cached for ease of computing in the application server computer. SPP is then performed for each period included in the PPA. The steps included in the SPP container step are shown in more detail in FIG. 3B.

Afterwards, post-PPA steps are performed. Post-PPA steps include summarizing the data for each individual or entity associated with the tenant, such as a sales representative, comparing the payments generated against each individual or entity from the previous version, generating the differences in the payment (both negative and positive) and moving the changes in payment to the current open period that PPA is being computed for, and data is synced across various databases to ensure consistency. The data is synchronized to various downstream systems to enable a tenant to view the new results generated from the Prior Period Processing (PPP) including net new payments or negative balances. For example, the orchestrator component illustrated in FIG. 1 orchestrates the movement of the data and ensures that all of the downstream systems are in sync. All the relevant application level events are recorded during the calculation process. When the synch process is invoked all of the events are replayed on the target production database. For example, two events are recorded: DELETE_ORDER_BY_BATCH & CREDIT_CALC_ENUM in the calculation database. When the DELETE_ORDER_BY_BATCH event is replayed, the relevant data is deleted in the target production database. The CREDIT_CALC_EVENT will trigger a copy of Credits from the calculation database into the target production database. Finally, the new results generated in the calculation database are moved to the production database replacing the old version that is present in the production database. This process provides the ability for tenants to view all versions of their data. At any point in FIG. 3A there may be pauses or waiting steps to ensure processing completes as needed before moving to a subsequent step. Errors may be handled in any manner.

Figure 3B:
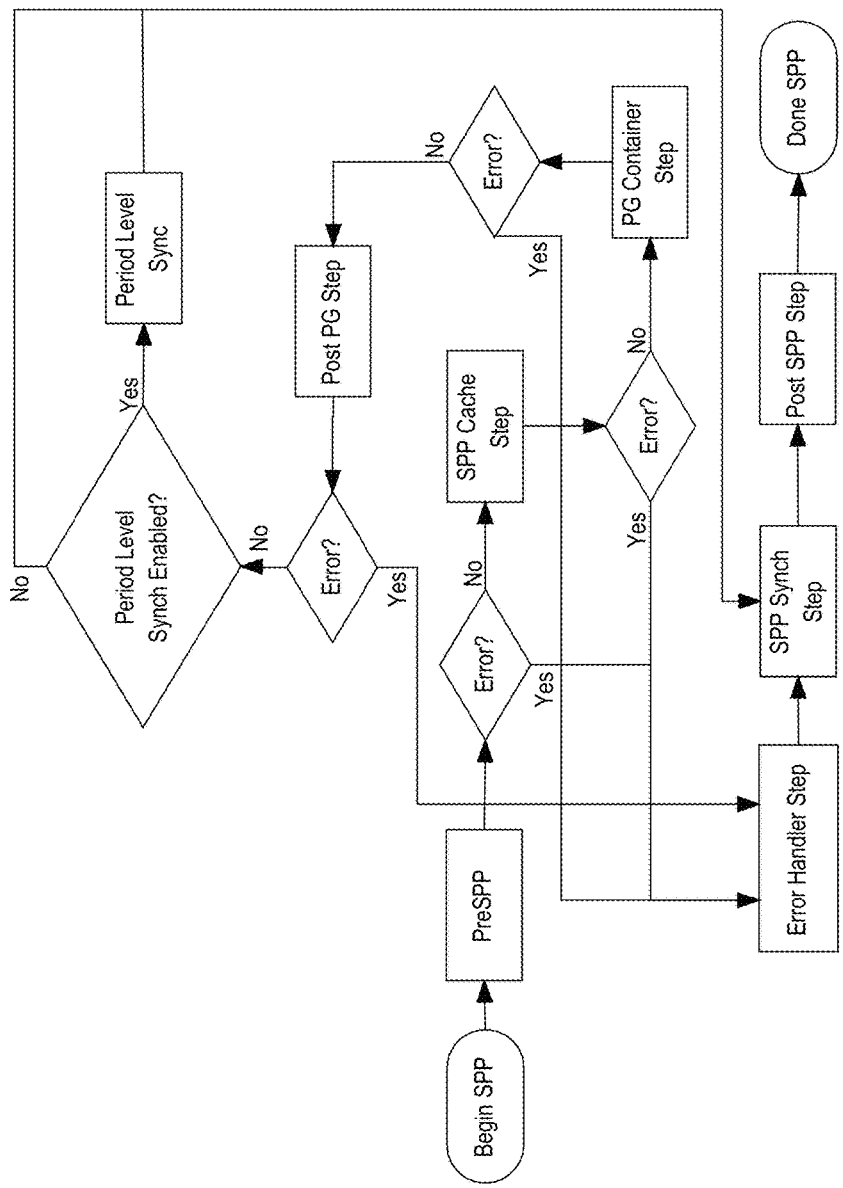

FIG. 3B shows SPP process 305. Initially, as shown in SPP process 305, preparatory and other pre-SPP steps are performed to setup the SPP process and access needed data. Subsequently, necessary data is cached, and the process groups are executed. The steps included in the PG container step are shown in more detail in FIG. 3C. Subsequently, post-process group steps are performed, and data is synchronized to production databases if or as needed, dependent on the workflow or policies of the tenant, and post-SPP steps are performed, such as updating status or synchronizing any remaining data across the various databases. At any point in FIG. 3B there may be pauses or waiting steps to ensure processing completes as needed before moving to a subsequent step. Errors may be handled in any manner.

Figure 3C:
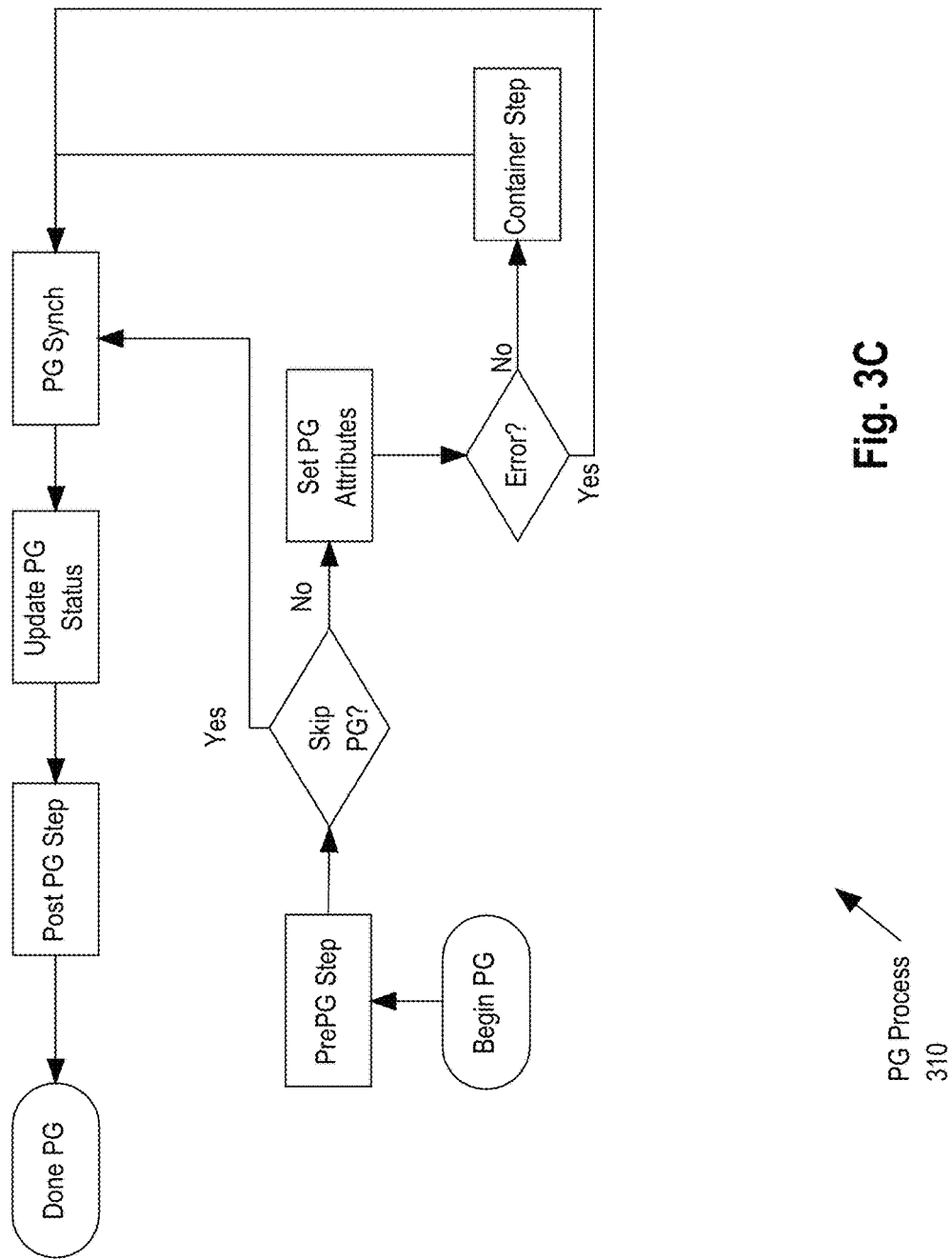

FIG. 3C shows the process group (PG) container step in more detail. In FIG. 3C, the PG process 310 begins with a prePG step to setup the PG process and access needed data. The setup process may include resolving batch types for the calculations loaded into the system. A determination is made whether the process group is to be skipped. A process group may be skipped if, for example, there are no batches for a specified batch type in the workflow or metadata. If not, the process group attributes are set, such as cache refresh options, or other settings, and the steps are executed in the container step. The steps included in the action container step are shown in more detail in FIG. 3D. Subsequently, the process group steps are synchronized. In PPA this step may be ignored if the PPA utilizes a delayed synchronization with the production databases. Subsequently, the status is updated, post process group steps are performed, such as a check to ensure that all batches or data has been processed successfully, and the process group is finished. If the process group was skipped, then the process group is synchronized, the status updated, and post process group steps are performed before the process group is completed. At any point in FIG. 3C there may be pauses or waiting steps to ensure processing completes as needed before moving to a subsequent step. Errors may be handled in any manner.

Figure 3D:
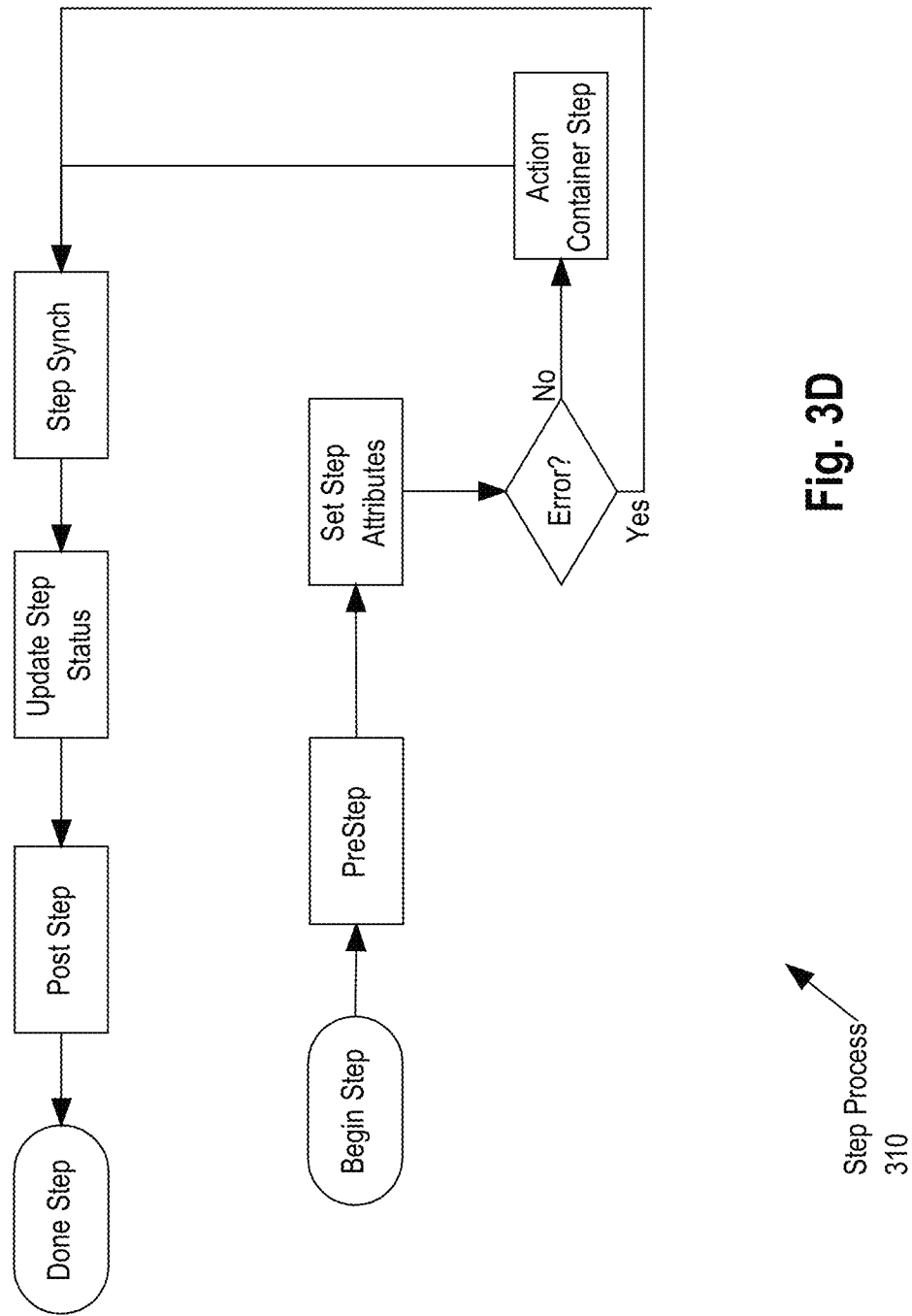

FIG. 3D shows step process 315. Initially, pre-step processing is performed to setup the step process and access needed data, which may be performed or contain steps similar to those discussed above in regards to FIG. 3A, FIG. 3B, or FIG. 3C. Attributes of the step are set, such as resolving batch names for any batch types specified in the step. Subsequently the actions of the step are iterated through in the action container step which is shown in more detail in FIG. 3E. Next, the step is synchronized, which may include copying data to one or more production databases. Optionally, the step may not occur during PPA, as the synchronization may be delayed. The status of the step is updated to completed or failed, and post step actions are performed, such as resetting process variables or other internal application steps, and the step is completed. At any point in FIG. 3D there may be pauses or waiting steps to ensure processing completes as needed before moving to a subsequent step. Errors may be handled in any manner.

Figure 3E:
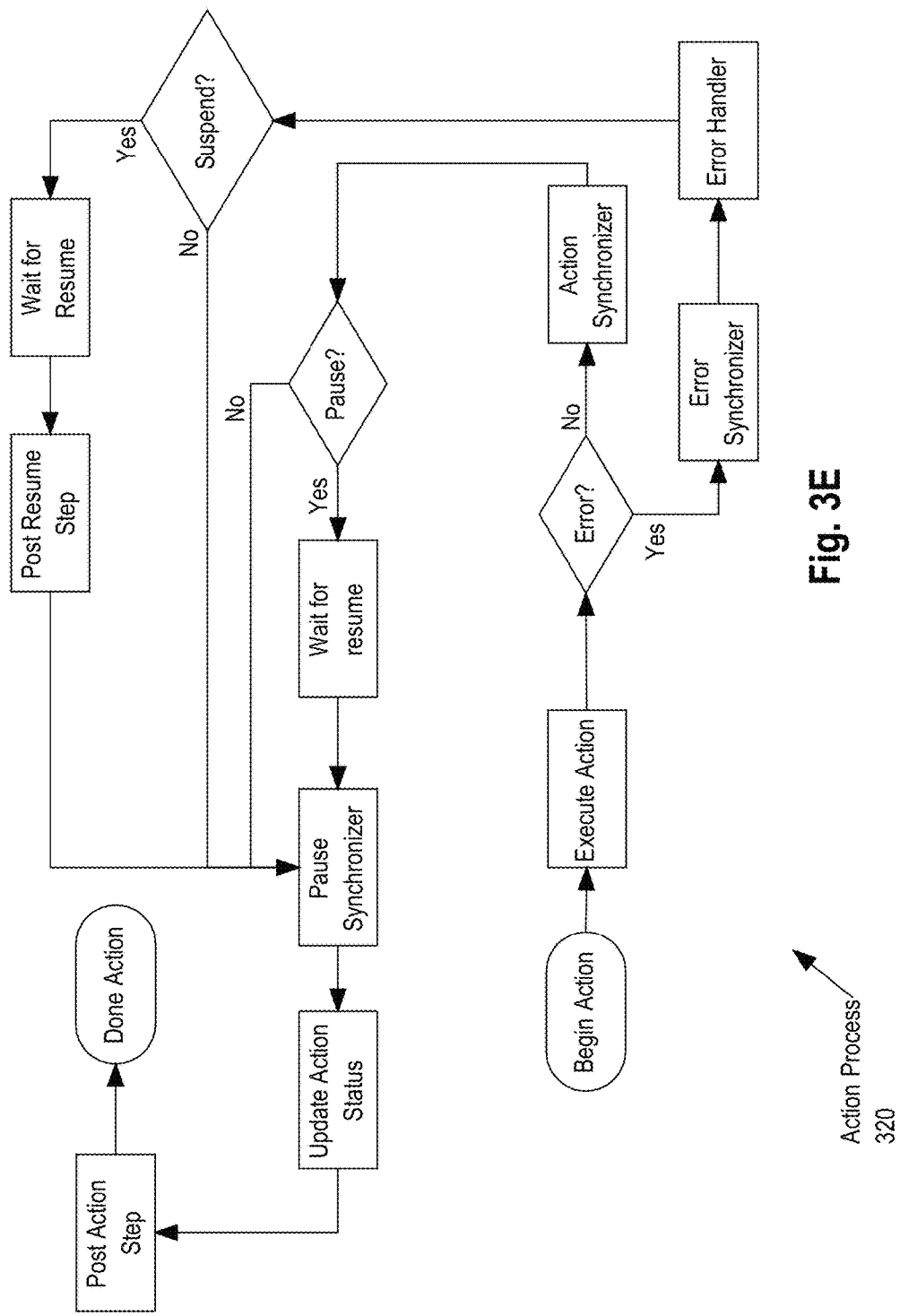

FIG. 3E shows action process 320. In FIG. 3E, action process 320 begins and the action is executed and synchronized. Examples of an action include calculations such as credits or incentives. If the action is paused or suspended, the process waits and subsequently synchronizes. After resuming, the action status is updated, and post action steps are performed, such as resetting internal variables of the process before the action is completed. At any point in FIG. 3E there may be pauses or waiting steps to ensure processing completes as needed before moving to a subsequent step. Errors may be handled in any manner.

Returning to FIG. 1, PPA orchestrator 115 is programmed or configured to perform PPA, process single processing periods, or a combination thereof, according to a workflow. The workflow, as discussed above, may include any number, type, and ordering of steps. The processing may occur at any time and may be performed in any suitable manner. Typically PPA is performed in response to a tenant or user request. The output generated by processing prior periods or single periods is a variety of results that have been calculated using data associated with the tenant. Specifically, the output may be compensation amounts, amounts owed the individual, amounts owed to the company, changes relative to a prior calculation of a same period, and other accounting or compensation data.

In one embodiment, PPA orchestrator 115 is programmed or configured to capture metadata about the processing and the output. The metadata may be any data related to or derived from the processing or the output. For example, the metadata may deal with holds and releases of payments, or the timings of other actions performed that are not directly specified in the workflow, so that the actions may be replicated at a corresponding time if PPA is performed.

In one embodiment, PPA orchestrator 115 is programmed or configured to store the output of PPA or SPP, and any metadata or related data items. As discussed above, the output, metadata, and data items may be stored in any suitable database or databases and, depending on the age of the information, may be stored in different schemas or databases. For example, data that is less than 6 months old may be stored in a first database, while older data is stored in a second database. Further, the data may be stored or grouped such that different views of the data are maintained, such as "January as of March" as discussed above in regards to FIG. 2. This may result in many different versions of "January" being stored. Once stored, the period is closed and can be reprocessed using PPA to recalculate the output in response to modified data.

In one embodiment, PPA orchestrator 115 is programmed or configured to generate a snapshot for PPA. The snapshot includes all of the relevant workflow data, steps, metadata, and other information needed to process a single period as of any period for which PPA is being performed. The snapshot is stored in a cache, and the snapshot is used in conjunction with the business, accounting, or other data to reprocess a single period when performing PPA. In other words, the snapshot provides the data needed to accurately reprocess a single period in the same order as before, even when the underlying business, accounting, or other data has changed.

In one embodiment, PPA orchestrator 115 is programmed or configured to receive modifications to data items related to a closed period. The modifications may be to any data item. For example, a modification may increase or decrease the amount of a sale, adjust the relationships or managers of a salesperson, or change a compensation scheme. The modifications may be received at any time, such as seconds after closing a period to years after closing a period. The modifications may be stored in any suitable manner and location, and may be grouped or stored based on the open period in which the modifications were received. Some data may not be directly modifiable by a tenant, such as output from SPP or PPA. In one embodiment, modifications may be received during processing of a SPP or PPA.

In one embodiment, PPA orchestrator 115 is programmed or configured to determine differences between a current output of PPA and a prior output of PPA or a SPP. The current output and the prior output may be stored in any suitable database or other device or location. Typically, the differences when performing PPA are calculated amounts that are based on the underlying business, accounting, or other data. The calculated amounts may include, for example, different payment amounts to individuals or other entities. The differences may be identified by comparing each calculated value in the prior output to each calculated value in the current output, or in any other suitable manner. For example, for a given individual, the differences may include a bonus amount, a salary amount, a draw amount, a credit amount, a sale amount, a hold amount, etc. The differences may be stored in any suitable database or other device or location.

In one embodiment, PPA orchestrator 115 is programmed or configured to carry the difference over to an open period, send a notification about the differences, and cause displaying of the differences. Any identified differences are carried over to a current open period in any manner. Thus, if an individual is owed $100 as a result of PPA, then the $100 is carried over to the current pay period, and that individual would see an additional $100 on their next paycheck. PPA orchestrator 115 may send a notification about the differences in any manner to any suitable entity. For example, after PPA completes, the administrator, accountant, or other entity who requested PPA may be notified and shown the differences as a result of performing PPA. Subsequently, each individual impacted by PPA may receive a notification specifying any changes relevant to them. The differences may be displayed or caused to be displayed in any suitable manner on any device, and may be displayed at different levels of granularity. For example, an individual may see a total difference as a result of PPA, and may be able to view more specific details as well, such as each item that changed. Thus, a notification to an individual may indicate that, "you received $250 as a result of PPA, $300 is due to an increase in sales in March, and −$50 is due to a decrease in your bonus for April. The $250 will show up on your next paycheck on May 14$^{th}$."

3. Example Functional Implementation

Figure 4:
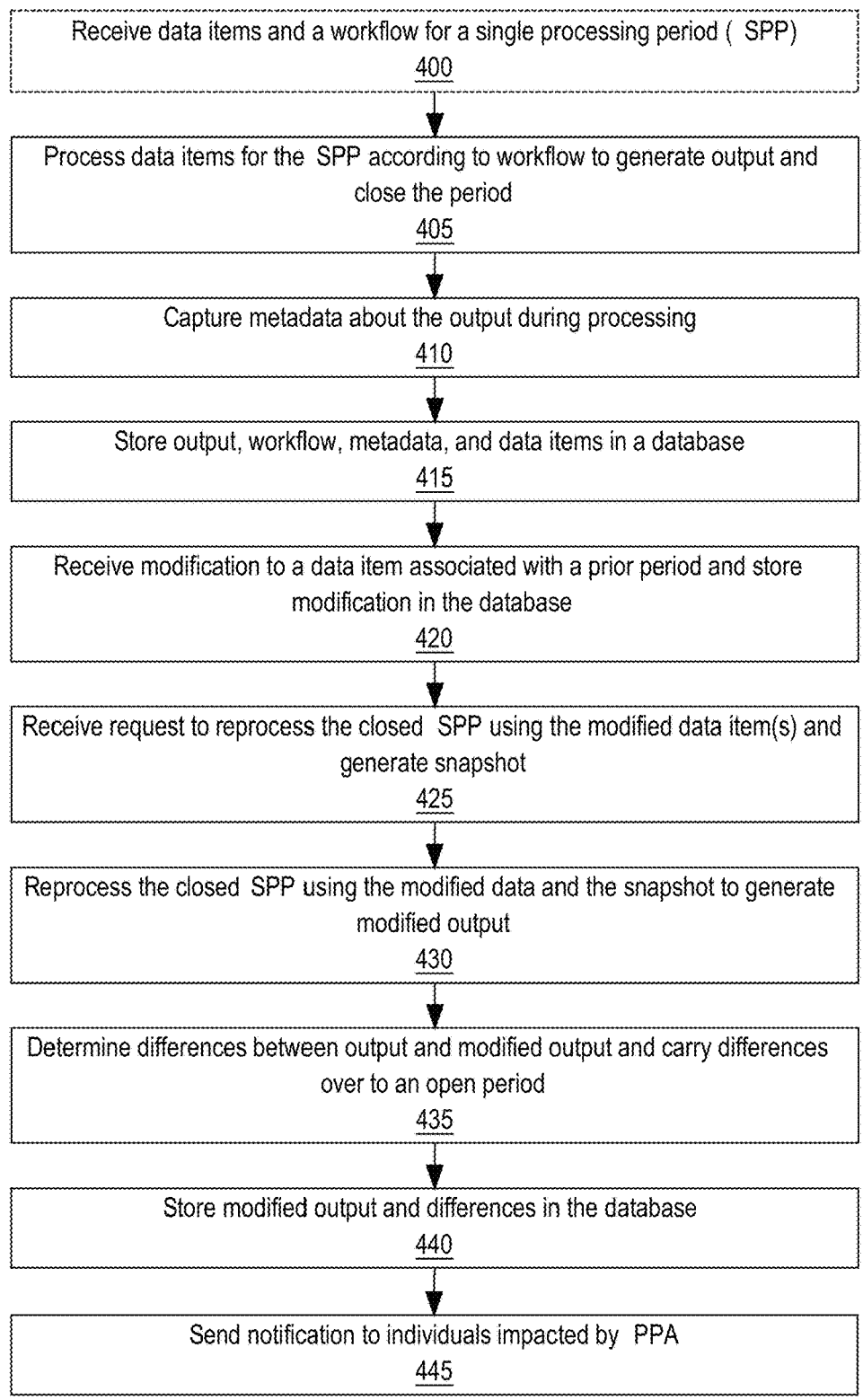
FIG. 4 illustrates a programmable algorithm or method in accordance with an embodiment.

FIG. 4 illustrates an example programmable algorithm or method for prior period adjustment. Although the steps in FIG. 4 are shown in an order, the steps of FIG. 4 may be performed in any order, and are not limited to the order shown in FIG. 4. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments, at the same level of detail that is used by persons of ordinary skill in the art to which the disclosure pertains for communicating with one another about similar computer programs or algorithms. In other words, each flow diagram in this disclosure is a guide, plan or specification of an algorithm for programming a computer to execute the functions that are described.

In step 400, data items and a workflow for a single processing period are received. As indicated by the dotted line, step 400 may be performed at any time or times. The data items may be received in any manner or format, and may be received as a step or steps of the workflow. Typically, the data items are business, accounting, or other data items that are used to process payroll or other accounting related tasks. The workflow may be received in any manner, and identifies the actions and steps to be performed when processing a single processing period. Specifically, the workflow includes process groups, which are groupings of steps to be performed. Each process group may be ordered or grouped with other process groups, and configured individually. A process group may be configured to be executed in a batch. Within a process group, any number of steps may be included, as discussed above. For example, the steps may be calculating a balance, or may be an external process such as accessing data from an external source and reformatting the data into a usable format. The steps may also be arranged in any order. Thus, the workflow is a "map" or "guide" that determines the exact order in which payroll or another accounting task is processed using the available data. By specifying the order, the processing of the data items is able to be replayed at a later date, using different or modified data. In other words, PPA may be accurately performed by utilizing the workflow.

In step 405, data items for a SPP are processed according to the workflow to generate an output. The period is closed after processing. The processing of a SPP may take any amount of time. Typically, given the large amount of data involved, the processing takes anywhere from several minutes to a day. The period is closed after processing, meaning that the period is deemed completed and all balances, credits, or debits have been paid or appropriately rolled into the next accounting period.

In step 410, metadata about the output is captured during processing. The metadata may include any data that is relevant to reprocessing of the period. For example, when holds are placed on an incentive, or precisely when a credit is applied, may be captured. These actions, while outlined in steps in the workflow, are not precisely specified in the workflow, as doing so for potentially thousands of individuals is impossible. Thus, the metadata needs to be captured as the processing occurs, so that when the data is reprocessed the same timing can be used.

In step 415, the output, workflow, metadata, and data items are stored in a database. The output, workflow, metadata, and data items may be stored in one or more databases and in one or more formats. All of the data may be stored according to the period which it relates, or using any other method.

In step 420, a modification to a data item associated with a prior period is received and stored in the database. The modification may be to any data item. For example, if a salesperson had entered a sale of $3,000, but the sale was actually $2,300, then the modification may be reducing the sale by $700. This may have downstream effects, such as causing the salesperson to fall into a lower bonus tier, which can only be determined by reprocessing the now-closed period. The modification may be received at any time, although typically modifications are not accepted to data that is older than 12 or 18 months.

In step 425, a request to reprocess the closed period using the modified data item is received and a snapshot is generated. In other words, the request is to perform PPA. The request may be received in any format and from any suitable user, such as an accountant or other administrator. Optionally, due to the large processing requirements, there may be a limit on how many requests may be received in a given period, such as 5 a month. The snapshot includes all of the relevant workflow data, steps, metadata, and other information needed to process a single period as of any period for which PPA is being performed. The snapshot is stored in a suitable cache.

In step 430, PPA is performed on the closed period by reprocessing the period using the modified data and the snapshot to generate modified output. Specifically, using the workflow, the actions and calculations that were originally performed on the period are performed again, in the same order, on the modified data resulting in the modified output.

In step 435, differences between the output and the modified output are determined and carried over to an open period. The differences may be in any calculated item, may be of any size or amount, and any number of differences may be identified. The dollar amounts associated with the differences, whether positive or negative, are carried over to a current, open, period so that distributions to individuals may be adjusted appropriately.

In step 440, the modified output and differences are stored in the database. The modified output may be saved in one or more databases, and may be organized by the "as of" period or any other method. By storing the results separately using the "as of" period, PPA may be performed multiple times on the same period, using different modified data each time, while maintaining accuracy and ensuring that the changes are appropriately tracked and documented. The modified data and any other information used to generate the modified output may also be saved with the modified output.

In step 445, a notification is sent to individuals impacted by PPA. In one embodiment, the notification is optional. The notification may be sent in any suitable manner such as email, text message, or a simple line item on a pay stub. The notification may involve displaying, or causing to be displayed, the differences on a display device, such as a computer monitor or smartphone screen. The display may indicate the changes as a result of PPA, and may include multiple levels of granularity. For example, rather than simply indicating the net change, such as "you received $300 extra due to PPA," the specific items or payments that changed may be shown, such as, "you received $250 extra due to an increased bonus in March, and $50 extra due to a reimbursement in April."

Using this process, PPA may be accurately performed in a multitenant environment, which was previously too costly in time, processing power, impossible to perform, or at best was performed in a black box. In particular, by enabling each tenant to specify their own individual workflow, then accurately processing their data items according to their workflow while accurately capturing additional data needed to reprocess the data when requested, PPA is able to be performed. Further, the level of detail provided in determining the differences between a previous calculation, such as the original run of a period, for example January, and a subsequent calculation, such as the as of period or January as of February is far higher than was previously possible. By using the method above, individual users or entities may see which individual payments to them changed, rather than a simple combined total.

4. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and program logic to implement the techniques.

Figure 5:
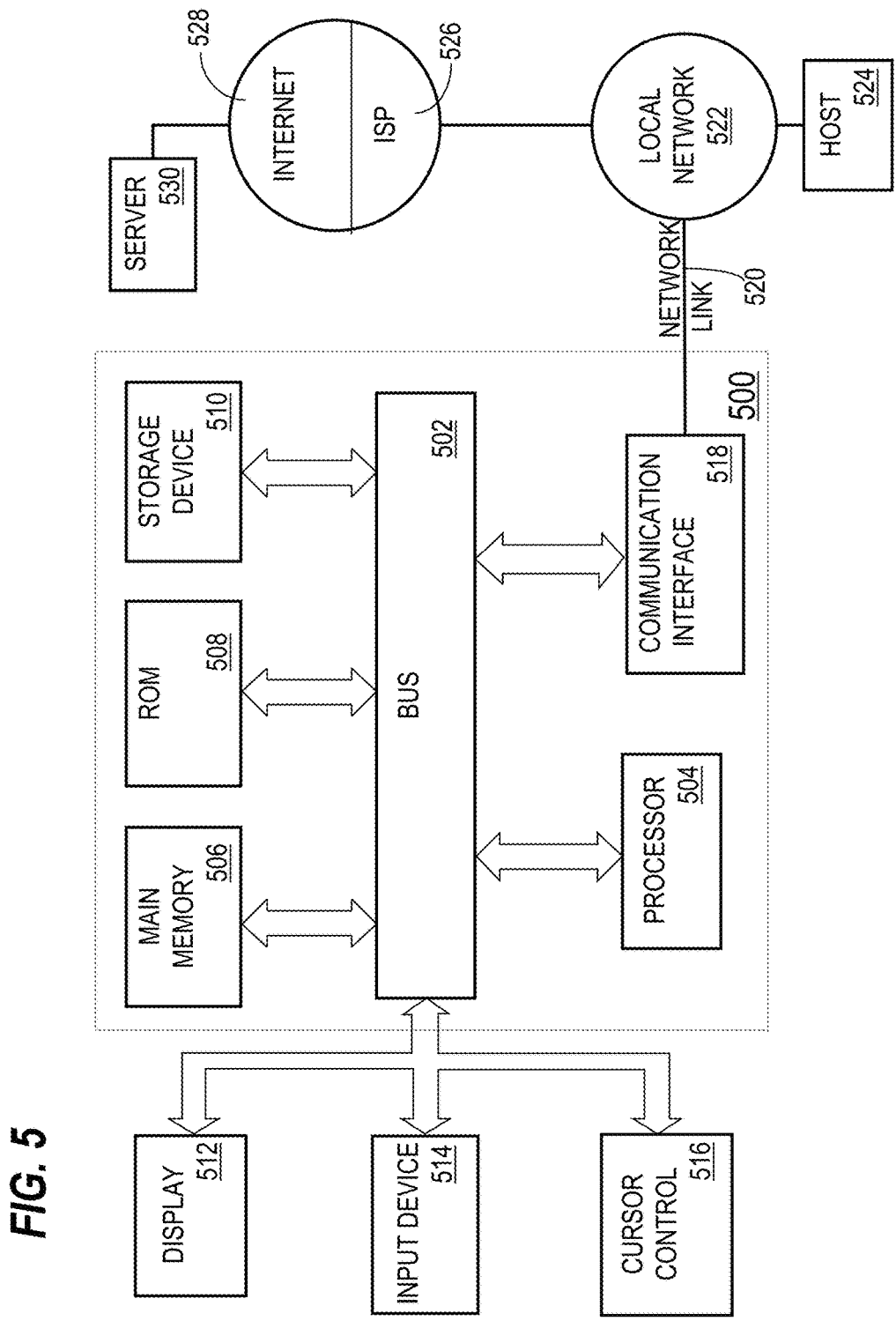
FIG. 5 illustrates a computer system upon which an embodiment may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and instructions that cause a machine to operation in a specific fashion. Such storage media may comprise non-volatile media and volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and stored in storage device 510, or other non-volatile storage for later execution.

Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A data processing method comprising computer implemented steps of:
   using an application server computer, receiving a workflow data for processing a period, wherein the workflow data comprises a plurality of steps for processing a plurality of data items related to the period;
   processing the plurality of data items according to the workflow data to generate an output, wherein the period is closed after processing by locking data associated with the period;
   capturing, during processing, metadata about the output;
   storing the output, the workflow data, the plurality of data items, and the metadata in a database;
   receiving a modification to one or more of the plurality of data items and storing the modification to result in a modified plurality of data items;
   receiving, during an open period, a request to reprocess the period using the modified plurality of data items, wherein the open period is subsequent to the period associated with the modified plurality of data items;
   in response to the request, processing, according to the workflow data and the metadata, the modified plurality of data items to generate modified output;
   determining a difference between the output and the modified output;
   carrying the difference over to the open period by storing the difference.

2. The method of claim 1, wherein the workflow data comprises one or more process groups, each process group comprising one or more steps, and wherein the one or more process groups and the one or more steps are ordered.

3. The method of claim 1, wherein processing the modified plurality of data items comprises:
   generating a snapshot of the workflow data for the period and caching the snapshot for a duration of processing of the period;
   deleting the cached snapshot after processing the period is completed.

4. The method of claim 1, the plurality of steps further comprising an external process step comprising:
   calling an external process;
   waiting an amount of time for a response to the external process;
   sending a notification when the amount of time is exceeded.

5. The method of claim 1, further comprising:
   displaying, for an individual, a difference in payment for the open period based upon a portion of the difference between the output and the modified output, wherein the difference is reflected in a subsequent paycheck for the individual.

6. The method of claim 5, wherein the difference is displayed in aggregate and in detail.

7. The method of claim 1, further comprising:
   storing the modified output and the modified data items in the database as a second version.

8. The method of claim 1, wherein the difference is associated with a particular SPP.

9. The method of claim 1, wherein the metadata comprises data associated with holds and releases.

10. The method of claim 1, further comprising:
    displaying, at a tenant device while processing the modified plurality of data items, a different copy of the modified plurality of data items, wherein the different copy is modifiable.

11. A computer system comprising:
    a production database storing tenant data that is associated with a plurality of different tenants of an application service provider;
    one or more application server computers communicatively connected to the production database, the one or more application server computers comprising one or more processors and electronic digital memory storing one or more sequences of instructions which, when executed by the one or more processors, cause the one or more processors to perform:
    receiving a workflow data for processing a period, wherein the workflow data comprises a plurality of steps for processing a plurality of data items related to the period;
    processing the plurality of data items according to the workflow data to generate an output, wherein the period is closed after processing by locking data associated with the period;
    capturing, during processing, metadata about the output;
    storing the output, the workflow data, the plurality of data items, and the metadata in the production database;
    receiving a modification to one or more of the plurality of data items and storing the modification to result in a modified plurality of data items;
    receiving, during an open period, a request to reprocess the period using the modified plurality of data items, wherein the open period is subsequent to an as of period;
    in response to the request, processing, according to the workflow data and the metadata, the modified plurality of data items to generate modified output;
    determining a difference between the output and the modified output;
    carrying the difference over to the open period by storing the difference.

12. The system of claim 11, wherein the workflow data comprises one or more process groups, each process group comprising one or more steps, and wherein the one or more process groups and the one or more steps are ordered.

13. The system of claim 11, wherein processing the modified plurality of data items comprises:

generating a snapshot of the workflow data for the period and caching the snapshot for a duration of processing of the period;

deleting the cached snapshot after processing the period is completed.

14. The system of claim 11, the plurality of steps further comprising an external process step comprising:

calling an external process;

waiting an amount of time for a response to the external process;

sending a notification when the amount of time is exceeded.

15. The system of claim 11, further comprising:

displaying, for an individual, a difference in payment for the open period based upon a portion of the difference between the output and the modified output, wherein the difference is reflected in a subsequent paycheck for the individual.

16. The system of claim 15, wherein the difference is displayed in aggregate and in detail.

17. The system of claim 11, further comprising:

storing the modified output and the modified data items in the database as a second version.

18. The system of claim 11, wherein the difference is associated with a particular SPP.

19. The system of claim 11, wherein the metadata comprises data associated with holds and releases.

20. The system of claim 11, further comprising:

displaying, at a tenant device while processing the modified plurality of data items, a different copy of the modified plurality of data items, wherein the different copy is modifiable.

* * * * *